(12) United States Patent
Yabe

(10) Patent No.: US 6,655,432 B1
(45) Date of Patent: Dec. 2, 2003

(54) BUILDING BOARDS, MANUFACTURING APPARATUS OF THE SAME

(75) Inventor: Tomoyoshi Yabe, Aichi (JP)

(73) Assignee: Nichiha Corporation, Nagoya (JP)

( * ) Notice: Subject to any disclaimer, the term of this patent is extended or adjusted under 35 U.S.C. 154(b) by 235 days.

(21) Appl. No.: 09/695,936

(22) Filed: Oct. 26, 2000

(30) Foreign Application Priority Data

Oct. 28, 1999 (JP) .......................................... 11/307100

(51) Int. Cl.$^7$ ............................................. B32B 31/20
(52) U.S. Cl. ...................... 156/359; 156/479; 156/553; 156/559; 156/583.1
(58) Field of Search .......................... 156/71, 202, 216, 156/497, 479, 475, 476, 492, 583.1, 553, 559, 358, 359, 583.4; 52/390, 591.4

(56) References Cited

U.S. PATENT DOCUMENTS

| 3,383,262 | A | * | 5/1968 | Ettore et al. | ................ | 156/216 |
| 3,909,343 | A | * | 9/1975 | Posselt | ....................... | 156/538 |
| 5,118,374 | A | * | 6/1992 | Suwitoadji | .................. | 156/216 |

FOREIGN PATENT DOCUMENTS

| JP | 54-114406 | 8/1979 |
| JP | 56-116543 | 7/1981 |
| JP | 4-38360 | 2/1992 |
| JP | 6-200673 | 7/1994 |
| JP | 9-156040 | 6/1997 |

OTHER PUBLICATIONS

Copy of Office Action dated Jul. 9, 2002 issued in Corresponding Japanese Application (including Abridged Translation of front page and cited references).
Japanese Office Action and abridged translation regarding Patent Application No.: Hei 11–307100.

* cited by examiner

Primary Examiner—Richard Crispino
Assistant Examiner—George R. Koch, III
(74) Attorney, Agent, or Firm—Shook, Hardy & Bacon, LLP

(57) ABSTRACT

A building board 1 which comprises a cement substrate 14, a front surface coat layer 5 formed on the front surface of the cement substrate 14, and a plastic sheet layer, preferably a polyethylene sheet layer 15 formed on the back surface 12 of the cement substrate 14. A plastic sheet, preferably polyethylene sheets M and F are adhered onto the rabbeted portions 2 and 3, respectively, of the cement substrate 14. Since the rabbeted portions 2 and 3 are covered with polyethylene sheets M and F, the water absorption from the rabbeted portions 2 and 3 can be effectively prevented. and the dimensional change in the whole board can be reduced.

3 Claims, 13 Drawing Sheets

(PRIOR ART)

BUILDING BOARDS, MANUFACTURING APPARATUS OF THE SAME

BACKGROUND OF THE INVENTION

1. Field of the Invention

The present invention relates to a building board which is suited for use for constituting the external wall of building, and in particular to building board whose rabbeted portions are improved in waterproof property. The present invention also relates to a manufacturing apparatus for such a building board.

2. Description of the Related Arts

FIG. 14 shows a cross-sectional view in the vertical direction of a building board to be employed in the conventional horizontal siding work. On the surface of this building board 1, a pattern (design portion) 4 is provided and a top coating layer 5 formed on the pattern 4. At the upper horizontal edge portion a horizontally prolonged building board 1 is provided with an underlying rabbeted portion 3 for shiplap joint in the vertical direction, while at the lower horizontal edge portion of the building board 1 an overlying rabbeted portion 2 is formed. A caulking material 6 is applied to the underlying rabbeted portion 3. The caulking material 6 is pressed when the overlying rabbeted portion 2, which is formed on the lower horizontal edge portion of the building board 1 to be installed on the top side, is overlaid from the upside. Whereby it prevents a further invasion of rainwater from penetrating through gaps between the surface of the building board 1 located on the top and bottom. These overlying and underlying rabbeted portions 2 and 3 are formed by cutting work on the occasion of manufacturing the substrate.

FIG. 15 shows a structure in the vertical direction, which are constructed using a couple of building boards 1 shown in FIG. 14. In this case, these building boards 1 are joined together using metallic fixture 7. FIG. 16 shows a perspective view illustrating one example of the metallic fixture 7 shown in FIG. 15. This metallic fixture 7 comprises a substrate 8 and an engaging portion 9 which is extended forward from the substrate 8. A plurality of holes 11 are formed on the substrate 8 for attaching the substrate 8 to an underlying member by means of screws. The engaging portion 9 has a Y-shaped form in cross-section and branched into a downwardly inclined hook portion 9A and a upwardly inclined hook portion 9B which are to be engaged at the distal end portion with the overlying rabbeted portion 2 of the building boards 1. As shown in FIG. 15, the building boards 1 are fixed to the underlying member 10 (for example furring strip) by making use of the metallic fixture 7.

The overlying rabbeted portion 2 of the building board 1 shown in FIG. 14 is provided with an overlying tongue pattern portion at the front surface and an overlying tongue engaging portion at the back surface. The underlying rabbeted portion 3 is provided with an underlying tongue engaging portion formed such that it faces to the overlying tongue engaging portion and is covered by the overlying tongue pattern portion. This overlying rabbeted portion 2 cannot be coated even in a sealer coating to be performed by the ordinary roller coating on the back surface of the building board, the sealer coating being applied to improve the water-proofing of the back surface. Under the circumstances, there has been proposed a special sealer coating method as being disclosed in Japanese Patent Unexamined Publication 8-33861. Originally, the sealer coating however is not aimed to achieve a complete water-proofing at the back surface 12 of the building board 1, but is rather intended to accomplish a some degree of water-proofing at this portion of the building board 1. Therefore, it is essentially impossible in the aforementioned sealer coating to achieve a complete water-proofing of the back surface 12 of the building board 1.

On the other hand, the underlying rabbeted portion 3 is a portion whose surface is coated by spray coating, etc. from the front surface of the building board, so that a some degree of water-proofing is ensured. The reason why the expression of "a some degree" is adopted here is that, taking into consideration the fact that, in the case of building board consisting of a 3-ply structure comprising thin dense front and back surface layers, and a coarse thick central core layer (which may be a building board to be manufactured by means of a dry method), the coarse core layer comes to be exposed as a rabbeted portion as a result of the cutting work for forming the underlying rabbeted portion 3, thus this rabbeted portion becomes consequently poor in water-proofing as compared with the front and back surface layers.

With respect to the end portions (a slanted cut portion or a butt end of lumber) of both underlying and overlying rabbeted portions 2 and 3, the coating thereof becomes insufficient in spite of spray coating (the flow-down of coating material may be considered to be one of the causes). Therefore, there has been devised a special end-coating method as being disclosed in Japanese Patent Unexamined Publications 8-229501 or 10-15454. However, even in that method, the coated film at the end portions is generally insufficient in thickness, and hence, resulting in poor water-proofing as a matter of fact.

Meanwhile, there have been already proposed by the applicant several methods to greatly improve the water-proofing of building board by the application of a PE (polyethylene) backing sheet to the back surface of building board. However, any countermeasure to improve the water-proofing of the rabbeted portions has not been described, thus leaving a problem to be solved.

SUMMARY OF THE INVENTION

Therefore, an object of the present invention is to provide a building board which is capable of providing the rabbeted portions of building board with an absolute water-proofing.

Another object of the present invention is to provide an apparatus for manufacturing such a building board.

Namely, according to the present invention, there is provided a building board whose rabbeted portions of a cement substrate blank are covered by a plastic sheet.

The plastic sheet is preferably constituted by a polyethylene sheet since it can be manufactured at low cost, since it merely melts even if it is burnt without generating smoke, and since the combustion products thereof are only limited to water and carbon dioxide, giving no harm to lives.

The thickness of polyethylene sheet should preferably be in the range of 0.3 to 0.5 mm, which renders the polyethylene sheet to be well suited one in terms of strength, water-proofing and the adhesion thereof to the back surface of the cement substrate.

The building board manufacturing apparatus proposed by the present invention is provided with cover-forming heating means for covering the rabbeted portions of a cement substrate blank with a plastic sheet, which is effected through the heating of the plastic sheet.

The cover-forming heating means covers the rabbeted portions of building board with a plastic sheet after the trimming step of the backed layer, thereby enabling not only formation of a plastic sheet layer at the rabbeted portions with dimensional stability, but also further improvement in the water-proofing of the rabbeted portions.

BRIEF DESCRIPTION OF THE DRAWINGS

A more complete appreciation of the invention and many of the attendant advantages thereof will be readily obtained by reference to the following detailed description when considered in connection with the accompanying drawings, wherein.

DESCRIPTION OF THE PREFERRED EMBODIMENTS

Figure 1:
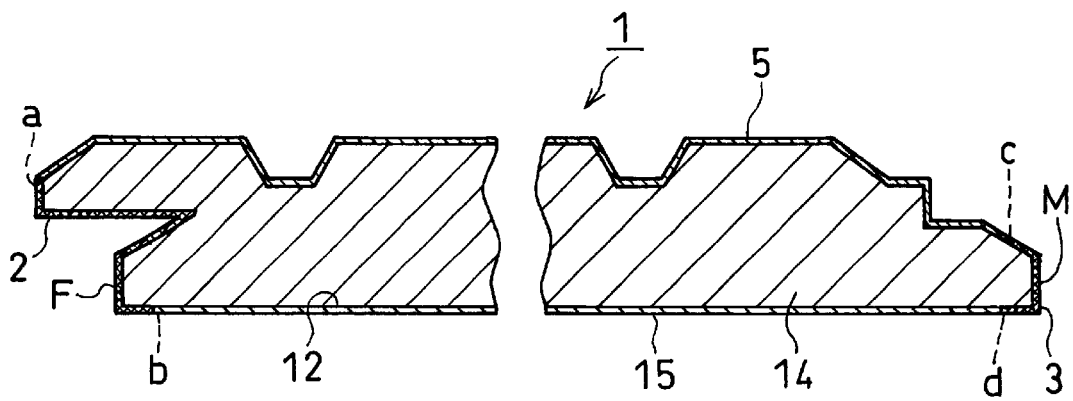
FIG. 1 is a partial cross-sectional view illustrating the construction of a building board according a first embodiment of the present invention.
Figure 2:
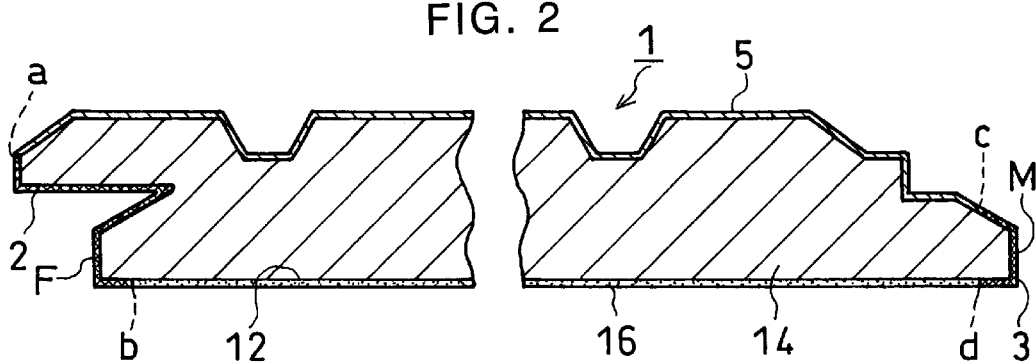
FIG. 2 is a partial cross-sectional view illustrating the construction of a building board according a second embodiment of the present invention.
Figure 3:
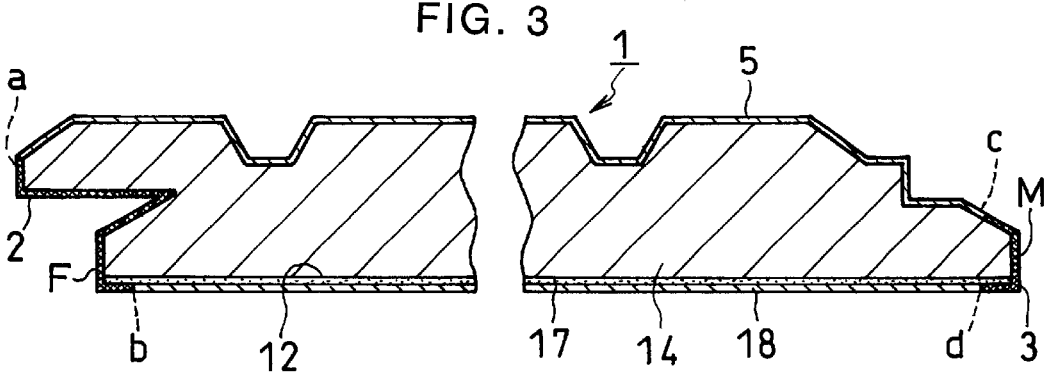
FIG. 3 is a partial cross-sectional view illustrating the construction of a building board according a third embodiment of the present invention.
Figure 14:
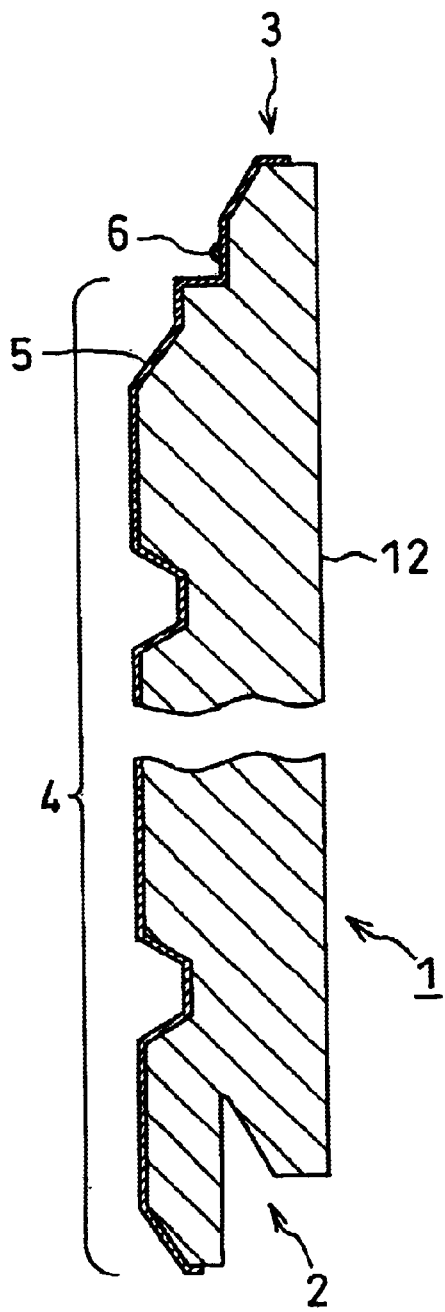
FIG. 14 is a cross-sectional view illustrating the construction of a conventional building board.
Figure 15:
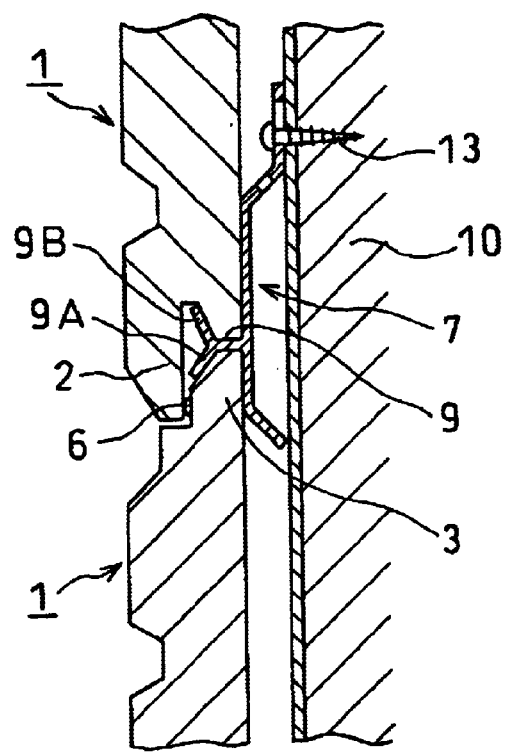
FIG. 15 is a cross-sectional view illustrating the manner of connection of the building boards in the vertical direction.
Figure 16:
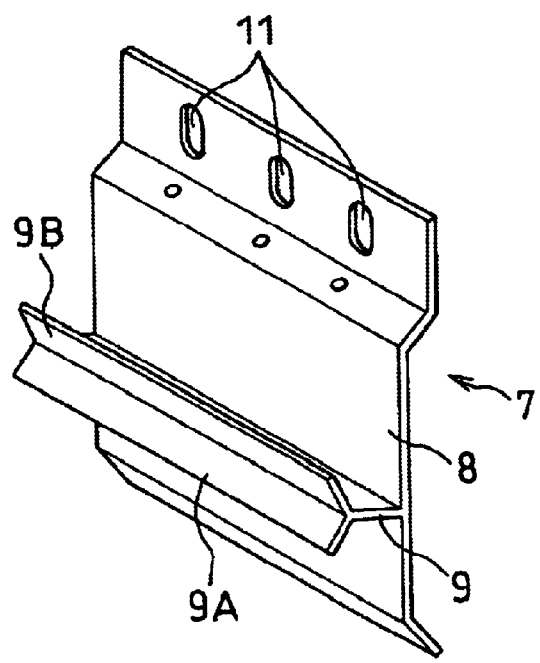
FIG. 16 is a perspective view of metallic fixture employed in connecting a plurality of building boards.

FIGS. 1, 2 and 3 show respectively a cross-sectional form of building board according to the present invention, which is shown in comparison with the cross-sectional form of the conventional building board shown in FIG. 14. The back surface,of the building board shown in FIG. 1 is covered by a polyethylene (PE) sheet layer 15; the back surface of the building board shown in FIG. 2 is constituted by a PE foam layer 16; and the back surface of the building board shown in FIG. 3 is covered by a regenerated polyethylene terephthalate (PET) sheet layer 18. In any of these embodiments, the rabbeted portions 2 and 3 are covered by the same PE film F and M, thus realizing a complete water-proofing of the building board as a whole.

FIG. 1 is a partial cross-sectional view illustrating the structure of the building board according to a first embodiment of the present invention, a building board 1 has a structure where a front surface coat layer 5 is formed on the front surface of the cement substrate 14, and a plastic sheet layer, preferably a PE sheet layer 15 is formed on the back surface 12 of the cement substrate 14. The cement substrate 14 can be manufactured by a process wherein a raw mat is prepared at first through the forming of a raw slurry on a porous base by means of paper-making or extrusion of the raw slurry, and the resultant composite is pressed and aged.

The raw slurry can be prepared by dispersing, for example, an inorganic hydraulic cement-based material, a ligneous reinforcing material; and optionally, an aggregate, a cure promotor, repellent and water repellent in water generally 5 to 20% or so by weight of solid matters.

In the above, Portland cement, a blast furnace cement composed of Portland cement and blast furnace slag, a fly ash cement containing fly ash, a silica cement containing silicic substance such as volcanic ash, silica fume and clay, an alumina cement, and a blast furnace slag, etc. are used as the inorganic hydraulic cement-based material. Wood flour, excelsior, chipping, woody pulp, soft-wood pulp, hard-wood pulp, ligneous fibre bundle, waste-paper pulp, hemp fiber, bagasse, rice hull, rice straw, and bamboo fibre, etc. are used as the ligneous reinforcing material. Perlite, cirrus balloon, expanded shale, expanded clay, sintered diatomaceous earth, fly ash, coal cinders and pulverized foamed concrete, etc. are used as the aggregate. Alkaline metal silicate, etc. is used as the cure promotor. Wax, paraffin, a surfactant and silicone, etc. are used as the repellent or the water repellent.

The use of a high-pressure-processed polyethylene resin having a density ranging from 0.910 to 0.925 g/cm3 as the polyethylene sheet layer 15 for the backing enables to obtain excellent properties of transparency, formability, heat adhesiveness, extensibility and impact strength. The thickness of the polyethylene sheet layer 15 should preferably be in the range of 0.07 to 0.30 mm, more preferably 0.10 to 0.20 mm or so. When the polyethylene sheet layer 15 is thinner than 0.07 mm, there may be a problem about strength and still more, it may become impossible to expect a sufficient water-proofing. Conversely, when the thickness of the PE (polyethylene) sheet layer 15 exceeds over 0.30 mm, the rigidity of the sheet becomes excessively high, so that there can be a problem in bonding it to the back surface of the cement substrate 14.

FIG. 2 is a partial cross-sectional view of the construction of a building board according a second embodiment of the present invention. The building board 1 has a structure where a PE foam layer 16 is formed on the back surface of the cement substrate 14.

Preferably, the PE foam layer 16 should be formed of a foamed PE resin that has been expanded by means of the atmospheric foaming. In this case, a foamed linear polyethylene is desirable as the PE resin with excellent chemical resistance and reproducible non-cross linked type is desirable as the formed linear polyethylene. It is possible, through a change in the quantity thereof, to manufacture various kinds of PE foam layer 16 ranging from a soft type to a semi-rigid type. Further, it is also possible, through a change in the density of a foaming agent, to mold a PE foam layer 16 having a desired thickness. The thickness of the PE foam layer 16 should preferably be in the range of 0.5 to 3.0 mm. Because, if the PE foam layer 16 is thinner than 0.5 mm, there may be a problem about the strength thereof and thus may become impossible to expect a sufficient waterproofing thereof. Conversely, if the thickness of the PE foam layer 16 exceeds over 3.0 mm, the resultant building board would become too bulky as a whole, thus deteriorating its commercial value.

The atmospheric foaming (the foam molding method under atmospheric pressure) comprises the steps: melt-kneading a mixture composing of a pre-foaming olefin resin such as polyethylene, polypropylene, etc, a composition containing other compound if necessary, and a pyrolitic foaming agent such as azodicarbonamide; the pre-foaming resultant mixture produced at the first step into a desired configuration such as a sheet-like configuration by any suitable means such as an extrusion molding, a press molding, etc.; and foaming the pre-foamed product produced at the second step in a heating chamber to produce a foamed product.

Additionally, known expansion methods such as an extrusion foaming method and a press foaming method are available.

The extrusion foaming method involves melt-kneading, for example, a pre-foaming resin composition by making use of an extruder, press-filling of an expansible liquid type foaming agent such as dichlorotetrafluoroethane or an inert gas type foaming agent such as carbon dioxide gas into the molten resin through a foaming agent inlet port that has been attached to a middle portion of the kneading zone of the extruder, or melt-kneading of a mixture comprising the pre-foaming resin composition and a pyrolitic foaming agent such as azodicarbonamide by making use of an extruder, and extrusion of the resultant kneaded mixture while expanding it into a desired configuration from an extrusion die.

The press foaming method involves melt-kneading, for example, a pre-foaming resin composition by making use of an extruder or rolls, pre-foaming of the resultant kneaded mixture into a sheet-like configuration or any other configuration, heating of the pre-foamed product by placing it in a pressure chamber such as an autoclave under pressure, impregnation of an expansible liquid type foaming agent such as dichlorotetrafluoroethane or an inert gas type foaming agent such as carbon dioxide gas from the surface of the pre-foamed product, and foaming of it by releasing the pressure inside the pressure chamber.

As for the foaming agent to be applied in the above foaming methods, on which it is not set any particular limitation, i.e. any kinds of foaming agent such as an expansible liquid type foaming agent such as a low-boiling point organic solvent, a swelling agent, etc.; an inert gas type foaming agent; pyrolytic foaming agent; etc. are available.

FIG. 3 is a partial cross-sectional view illustrating the construction of a building board according to a third embodiment of the present invention. The building board 1 has a structure where a backing layer comprising an outwardly foamed plastic layer, preferably a PE foam layer 17 and a non-foamed plastic layer, preferably a regenerated PET sheet layer 18 is successively formed on the back surface 12 of the cement substrate 1. As for the PE foam layer 17, the same kind of material as the PE foam layer 16 can be taken. As for the regenerated PET sheet layer 18, it is desirable to adopt a plastic sheet that is endurable to deformation as a whole even if it is heated over the temperature at which the PE foam layer 17 will foam. It is allowable to soften the regenerated PET sheet layer 18 more or less, and formed a layer in which the foamed PE and the regenerated PET are mixed.

As shown in FIGS. 1 to 3, the PE-covering region of the overlying rabbeted portion 2 extends from the point "a" to the point "b", while the PE-covering region of the underlying rabbeted portion 3 extends from the point "c" to the point "d". The slant surface portion starting upward from the point "a" is a visible design portion 4 (patterned portion), so that the PE-covering region does not extend up to this design portion 4. The slant portion extending downward from the point "c" as well as the slant portion at the overlying rabbeted portion 2 are for engagement with the locking strips with a Y-shaped form in cross-section of the metallic fixture. A PE-covering is applied to that portion for the purpose of improving the frictional pressing force relative to the locking strips. The reason why the PE-covering extending beyond the edge portion of the back surface 12 up to the points "b" and "d" are to ensure the water-proofing of the joint portion between the edge portion of the PE layer that has been already applied to the back surface 12 and the PE-covering sheet to be newly applied to the rabbeted portions.

Next, the apparatus for manufacturing the building board 1 having any one of the structures shown in FIGS. 1 to 3 will be explained. First, it may be considered that the superfluous portion of the backing sheet which is extended beyond the outer periphery of the back surface 12 is bent to directly adhere it onto each of the rabbeted portions 2 and 3. As a matter of fact however, since the superfluous portion of the backing sheet is already subjected to heating/cooling treatments, thus making this superfluous portion unstable in quality such as the dimension thereof. Therefore, in the following embodiments, one example will be described, where the covering work of the rabbeted portions 2 and 3 is subsequently performed on the building board that has been already back-worked using a plastic sheet (here, assuming that the trimming work of the rabbeted portions has been already finished).

Namely, three kinds of laminate board, each having a "PE" backing layer, a "foamed PE" backing layer or a "foamed PE +PET" backing layer, all of which are laminated according to the method disclosed in the previous patent application filed by the applicant, are to be provided. In this case, in order to cover these rabbeted portions 2 and 3 of each building board 1, it eliminates the need at all to use the same kind of material as the backing material, as far as the provision of water-proofing or the improvement of the engaging force of the rabbeted portions in any of the foregoing building boards 1 is concerned. Furthermore, having a merit of obviating a bothersome foaming operation, a PE sheet is adhered to the rabbeted portions 2 and 3 of any of the foregoing building boards 1 in the following embodiments of the present invention.

One of the problems involved in this case is that, by contrast to the almost flat back surface portion 12, the configuration of the rabbeted portions 2 and 3 is quite complicated including a slant portion and a recessed portion. Therefore, it can readily be imagined that the adhesion of the PE sheet layer to the rabbeted portions 2 and 3 in close contact with the complicated configuration would accompany a great difficulty.

Figure 4:
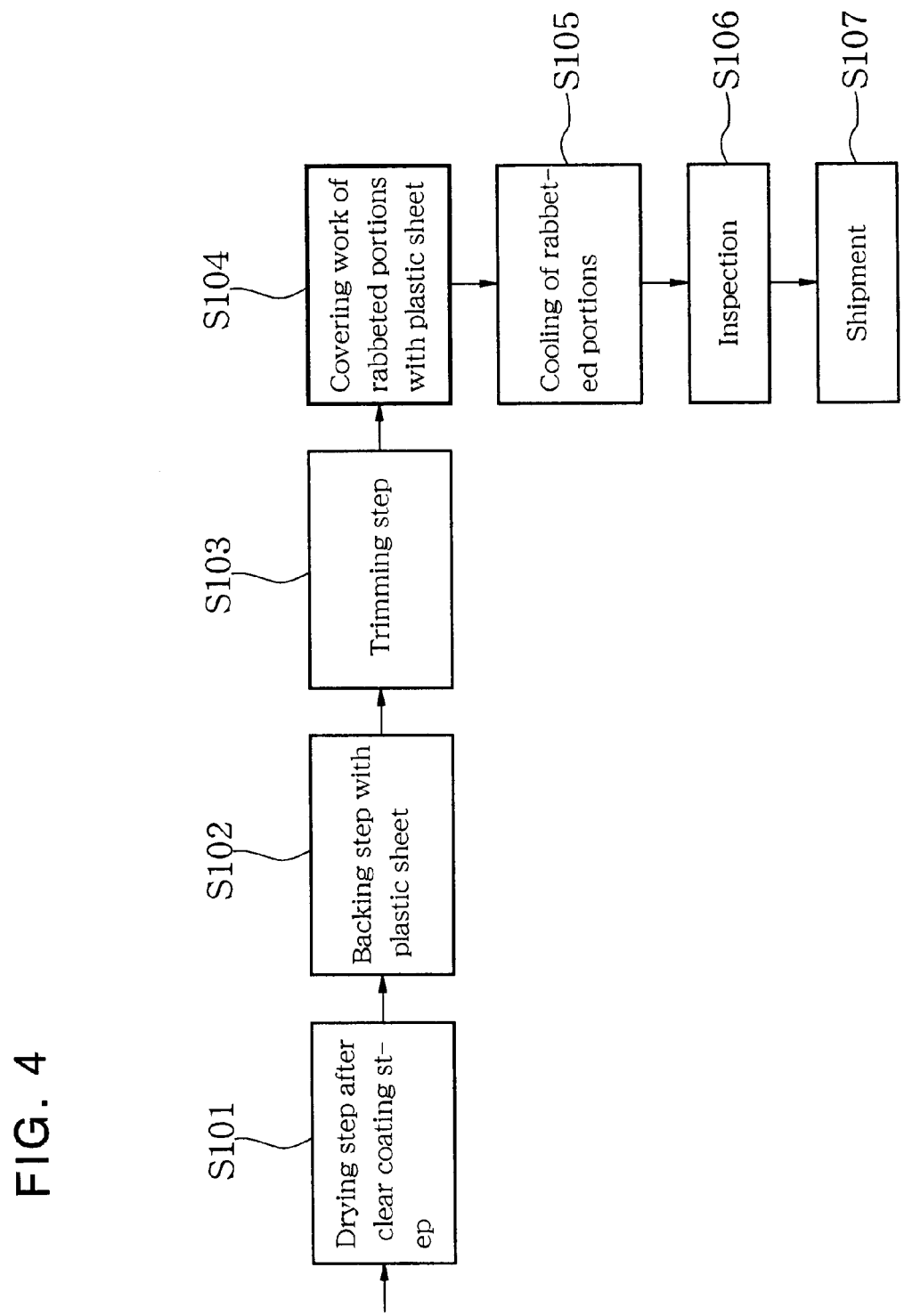
FIG. 4 is a process chart for explaining a step of covering and heating/the rabbeted portions of building board.

FIG. 4 is a process chart for explaining the manufacturing process of a building board. The heat treatment conditions of the final chamber inside a dryer are controlled, while measuring the temperature of the work board (surface temperature) by means of a non-contact surface pyrometer at the outlet port of the dryer of the drying step following the clear coating step (step S101). For example, it is controlled such that the temperature of the work board immediately after being transferred out of the dryer will be at 140±2° C., and that a plastic sheet is immediately thermally press-bonded to the back surface of work board heated at this temperature (holding it for 5 seconds at a clipping pressure of 330±50 kg/m2, for example) and the work board is cooled down (step S102). Next, the work board is transferred to a trimming step where a superfluous portion of the plastic sheet which is protruded outside the outline of the work board is cut off or trimmed (step S103). Thereafter, the covering work of the rabbeted portions 2 and 3 by making use of a plastic sheet is done according to the present invention (step S104). Then, the resultant building board is quickly quenched down to about 90° C. so as to solidify the PE sheet layer before it is transferred to a cooling step (air cooling) (step S105). Subsequently, the building board is advanced to an inspection step (step S106) and then made ready for shipment (step S107).

Figure 5:
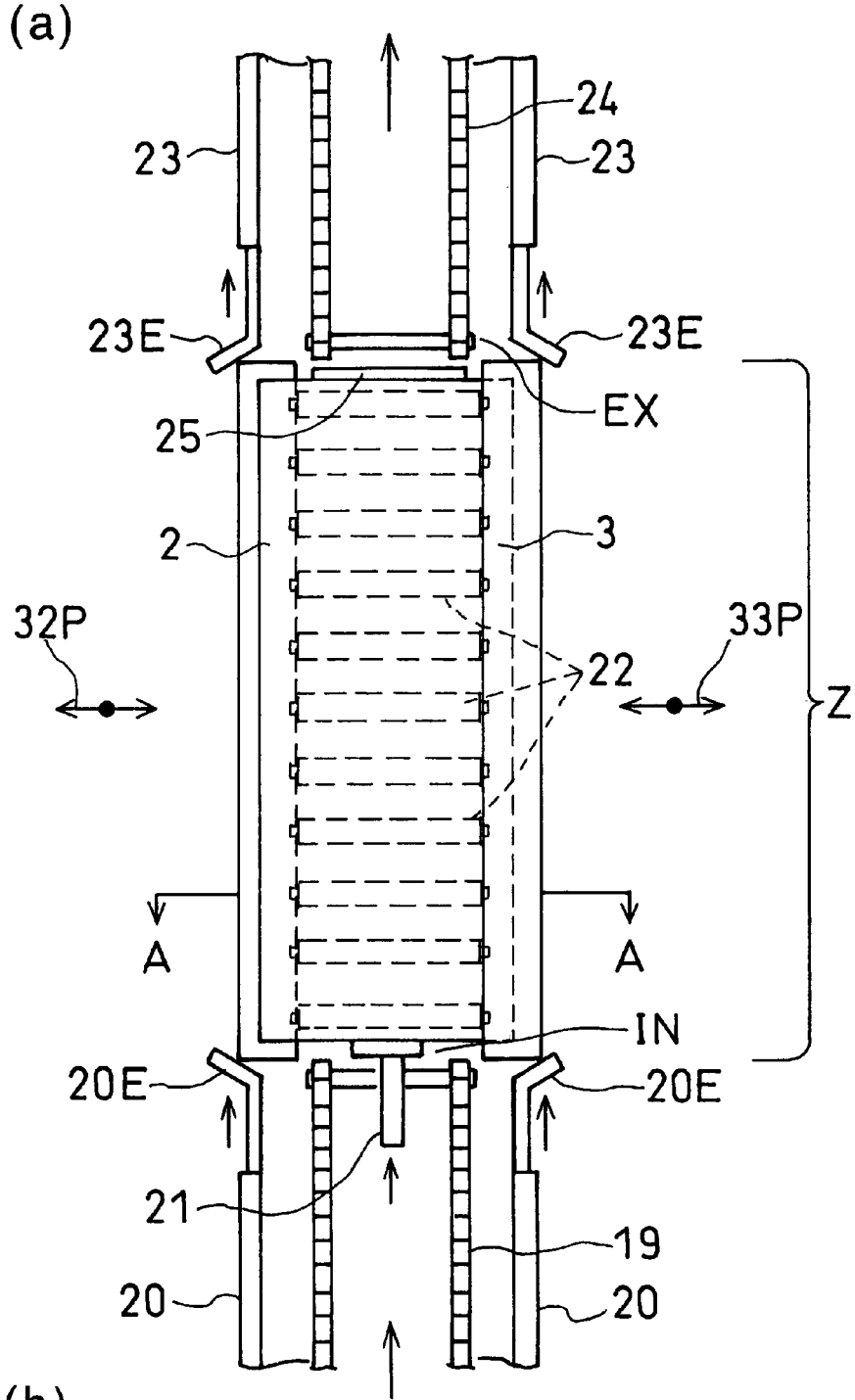
FIG. 5(a) is a plan view illustrating a plastic sheet-covering heating apparatus.
FIG. 5(b) is a view of a rubber plate, a stopper, and a building board.
Figure 5:
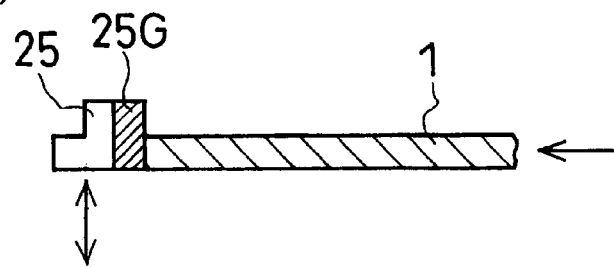

FIG. 5 is a top plan view of the apparatus for manufacturing a building board. The building board 1 is moved by means of a feed-in chain conveyor 19 up to a predetermined position of a working zone Z for covering the rabbeted portions. In this movement of the building board 1, inlet-guide sliding mechanisms 20 located at the inlet IN of the apparatus are extended by the advancing movement of the extension member 20E to a desired extent, thereby realizing the linear advance of the building board 1 in the zone Z. Alternatively, this extension mechanism of the inlet-guide sliding mechanisms may be substituted by a hanger type extension mechanism such as a crane.

The building board 1 is then stopped at a fixed stop position by means of a stopper 25 which is attached to the outlet of the zone Z and is controlled its elevational movement. The stopper 25 is provided with a rubber plate 25G so as to absorb the shock which occurs when the building board 1 collides with the stopper 25 (see FIG. 5(b)). At this moment, the building board 1 is supported through the back surface portion 12 by a large number of transferring rollers 22 (not provided with driving means) which are arranged in the zone Z. As soon as the building board 1 is stopped at the fixed position, the extension member 20E of the inlet-guide sliding mechanisms 20 is caused to regress as to be accommodated inside a sheath portion.

Thereafter, the covering work of the rabbeted portions 2 and 3 by making use of a PE sheet is performed by means of an overlying rabbeted-covering heating means 32 which is provided with a positioning mechanism 32P and an underlying rabbeted-covering heating means 33 which is provided with a positioning mechanism 33P (to be further explained hereinafter). When the PE sheet-covering work for the rabbeted portions 2 and 3 is accomplished, outlet-guide sliding mechanisms 23 attached to the outlet EX of the apparatus are extended up to a predetermined distance in the same manner as that in the inlet-guide sliding mechanisms 20 located at the inlet IN, thereby ensuring the linear advance of the building board 1. Then, the building board 1 is pushed forward by means of a pusher 21, thereby allowing the building board 1 to be transferred out of the zone Z by means of a bring-out chain conveyor 24.

Figure 6:
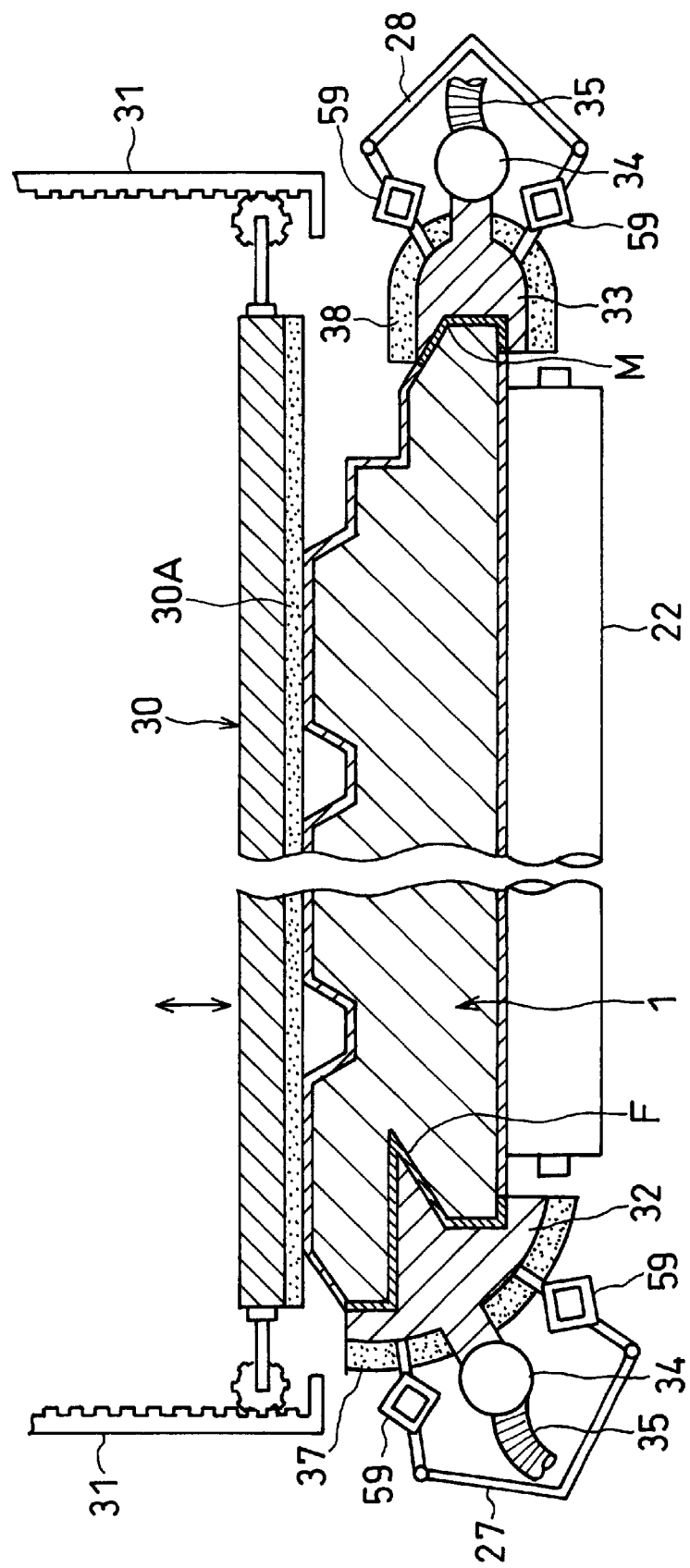
FIG. 6 is a cross-sectional view taken along the line A—A in FIG. 5 illustrating the plastic sheet-covering heating apparatus.
Figure 9:
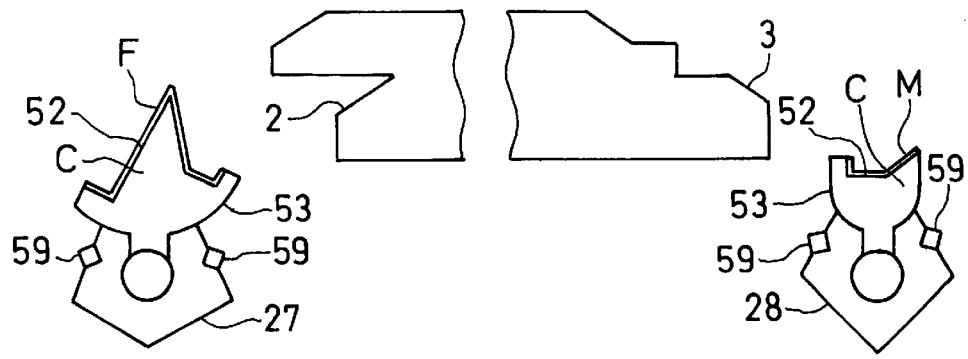
FIGS. 9(a), 9(b), 9(c), and 9(d) are a schematic diagram for explaining the positioning of a tubular body.
Figure 9:
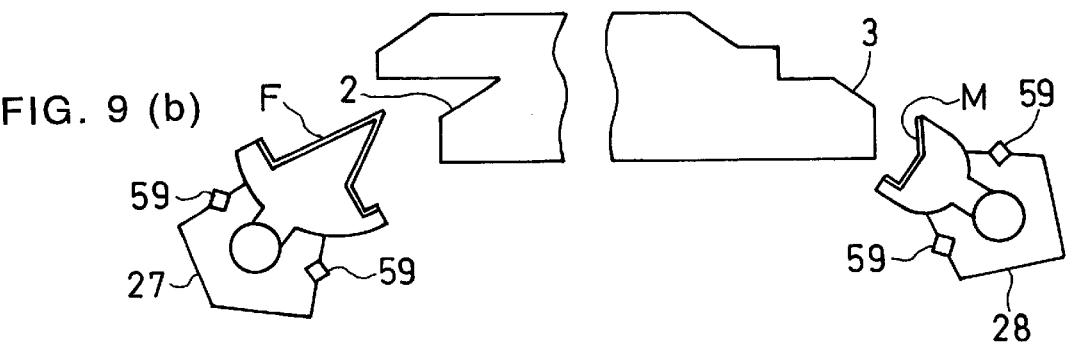
Figure 9:
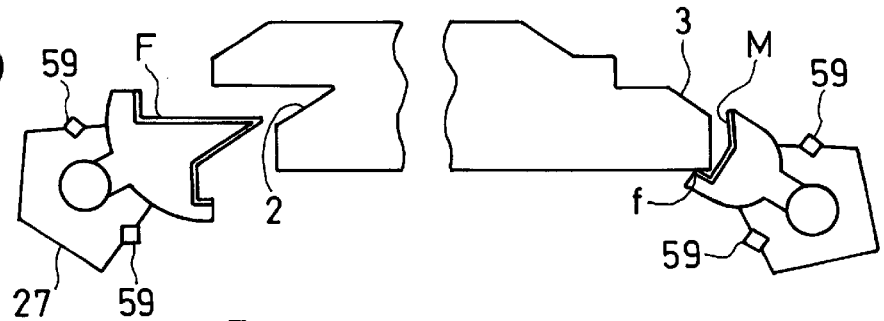
Figure 9:
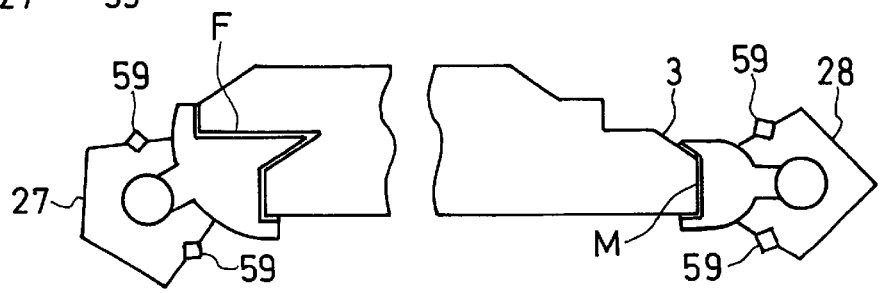

FIG. 6 is a cross-sectional view taken along the line A—A in FIG. 5, and illustrates a working state where an overlaying rabbeted-covering member F and an underlying rabbeted-covering member M are fusion-bonded to the overlying rabbeted portion 2 and underlying rabbeted portion 3, respectively (see FIG. 9). The overlying rabbeted-covering member F and the underlying rabbeted-covering member M are provided respectively with covering-heating means 32 and 33, which are sustained respectively by a robot hand 59.

Figure 8:
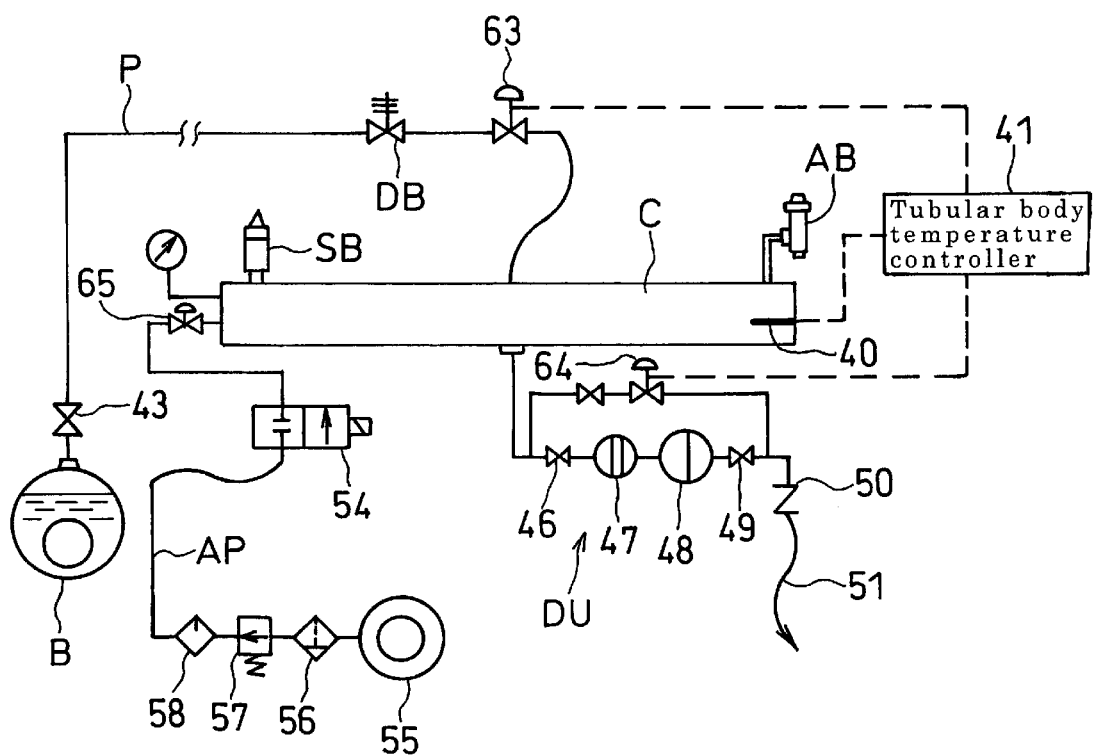
FIGS. 8(a) and 8(b) are a schematic diagram of the entire control system for a plastic sheet-covering heating apparatus.
Figure 8:
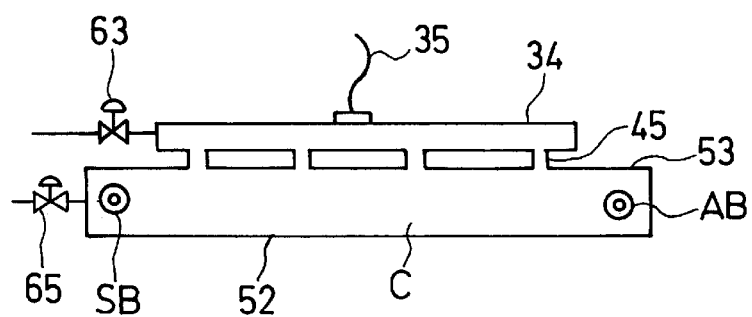

These covering-heating means 32 and 33 are respectively connected with a flexible pipe 35 via a feeding manifold 34. The details of these covering-heating means 32 and 33 are illustrated in FIGS. 8 and 9.

The surface of the building board 1 supported by a plurality of transferring rollers 22 is slightly pressed by means of an upper pressing plate 30 (the surface of which is covered by a sponge sheet 30A so as to protect the surface of the building board 1 as the building board 1 is pressed by the upper pressing plate 30). The elevational position of the upper pressing plate 30 is determined by means of an upper pressing plate-positioning mechanism 31 such as a rack-gear system.

Figure 7:
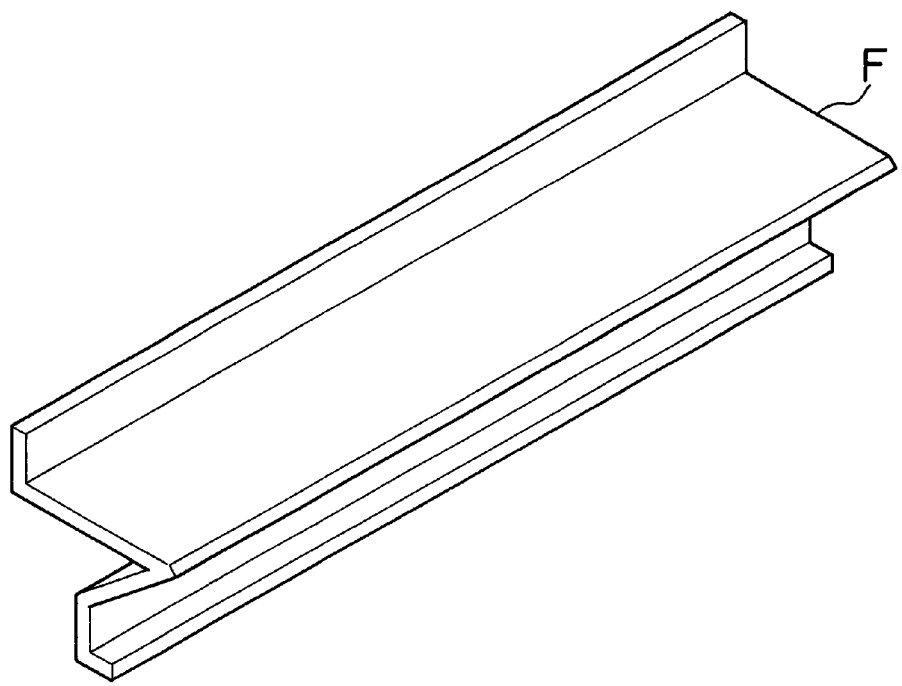
FIG. 7 is perspective views of the covering members F and M for the overlying rabbeted portion and underlying rabbeted portion, respectively.
Figure 7:
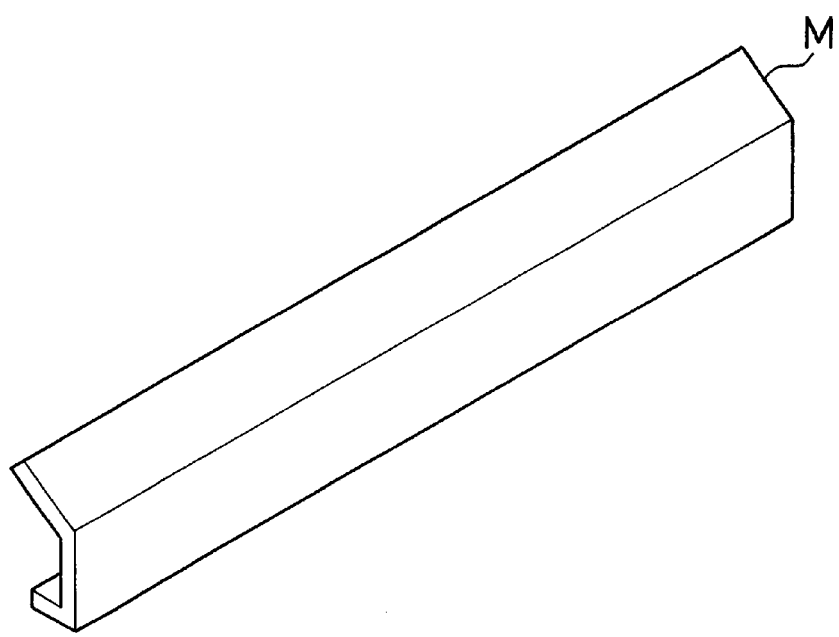

FIG. 7 is a perspective views of the covering members F and M (a PE sheet) for the overlying and underlying rabbeted portions, respectively. These covering members F and M are configured so as to conform with the configurations of the overlying rabbeted portion 2 and the underlying rabbeted portion 3, respectively. More specifically, the overlying rabbeted-covering member F has a cross-section combining an L-shaped configuration with a substantially U-shaped configuration, while the underlying rabbeted-covering member M has a cross-section of a substantially U-shaped configuration. These rabbeted-covering members are molded in advance by means of sheet molding technique. Namely, in this sheet molding technique, a plastic sheet is placed over a mold and heated to a softened state and then, the interior of the mold is sucked to reduce the inner pressure thereof, thereby molding the plastic sheet, the plastic sheet thus molded by being subsequently cooled and released from the mold.

As for the thickness of the overlying and underlying rabbeted-covering members F and M, it should be approximately 0.3 to 0.5 mm, but it at least requires the thickness maintainable the configurations shown in FIG.7 in the air.

FIG. 8 is the constructions of the covering-heating means 32 and 33 shown in FIG. 6, wherein FIG. 8(a) is a front side view, and FIG. 8(b) is a top plan view. The constructions of covering-heating means for the overlying and underlying rabbeted portions 2 and 3 are the same with each other, except that the profile of the tubular portion.

The covering-heating means 32 and 33 are designed such that the surface of PE sheet is heated by making use of saturated steam. The reason why the covering-heating means 32 is designed is that the configuration of the rabbeted portion (the surface where the laminate has a complexed structure). The surface temperature of the tubular body C is maintained at a predetermined temperature. In this case, with the interior of the tubular body C is filled with a saturated steam which is reduced to a predetermined pressure. The temperature of the saturated steam is to be controlled such that it is uniquely determined by the pressure of the saturated steam. Opening and closing a ball butterfly motor-driving valve 63 (which is to be opened or closed by means of motor) which is disposed on the inlet side and of a ball butterfly motor-driving valve 64 which is disposed at a bypass portion is controlled by means of a tubular body temperature controller 41, while measuring the temperature inside the tubular body C by making use of a thermistor 40.

Next, the operation of covering-heating means 32 and 33 will be explained.

(1) The ball butterfly motor-driving valve 63 on the inlet side is opened to fed steam, which is fed from a simplified boiler B and through a first valve 43 and a steam pipe P (the pressure of steam will be reduced at the midway by means of a pressure-reducing valve DB), thus allowing the tubular body C to be filled with the steam, within a short time, fed through a feeding manifold 34 and a feeding branch pipe 45. Initially, the air inside the steam pipe P and inside the tubular body C is pushed out by the steam being fed and brought out of the tubular body C through an automatic air vent valve AB. Further, originally, the ball butterfly motor-driving valve 64 is in open and then, closed after a predetermined time elapsed, thereby gradually bringing the interior of the tubular body C into a completely saturated state with steam. Incidentally, a safety valve SB is attached to an opposite end portion of the tubular body C to which the automatic air vent valve AB is attached. Further, rabbeted-covering members F and M are already mounted on the surface of the tubular body.

(2) The temperature inside the tubular body C is kept at a predetermined temperature through the control of the opening or closing of a couple of aforementioned ball butterfly motor-driving valves 63 and 64 by means of the aforementioned tubular body temperature controller 41, based on the result of measurement of temperature by means of the thermistor 40. A drain processing unit DU is disposed at the central portion of the bottom of tubular body C. This drain processing unit DU is constituted by an inlet valve 46, a strainer 47, a steam trap 48, an outlet valve 49, the aforementioned bypass portion, a check valve 50 and a flexible pipe 51.

(3) Under the conditions of the aforementioned paragraph (2), the covering and fusion-bonding work of the rabbeted covering members F and M onto the rabbeted portions 2 and 3 is executed.

On the other hand, the tubular body C has an elongated tubular configuration which is slightly larger than that of the longitudinal length of the building board 1. The heating surface 52 on the front surface for performing the fusion bonding work is shaped to conform with the configuration of each of the rabbeted-covering members F and M shown in FIGS. 6 and 7, and has a Teflon coating on the surface thereof. The back surface of the tubular body C, which constitutes the opposite side to the heating surface 52, is formed into a curved surface 53, and several feeding branch pipes 45, all communicated with the manifold 34, for feeding steam into the tubular body C are attached through welding at intervals along the longitudinal direction of the curved surface 53. The entire surface of the tubular body except the heating surface 52 as well as the steam piping system is covered with a heat-insulating material, for the purposes of not only minimizing the loss of thermal energy, but also ensuring the safety of the work place.

Upon finishing the fusion-bonding covering work after a predetermined period of time, the ball butterfly motor-driving valve 63 is closed to stop the feeding of steam to the tubular body C and at the same time, the ball butterfly motor-driving valve 64 is opened so as to discharge the steam inside the tubular body C. Subsequently, a 2-port electromagnetic valve 54 (always closed) connected with an air feeding ball butterfly motor-driving valve 65 which is attached to one end face of the tubular body C is opened for a predetermined period of time to feed a compressed air into the tubular body through an air pipe AP, thus quickly cooling the interior of the tubular body C. At the same time, the compressed air fed into the tubular body C is discharged through the automatic air vent valve AB to the outside of the tubular body C.

Then, the 2-port electromagnetic valve 54 is closed to stop feeding of the compressed air into the tubular body C, after a predetermined period time elapsed. Further, the air feeding ball butterfly motor-driving valve 65 is closed to bring the tubular body C to a state ready for steam feeding thereto in the next covering work step.

In this case, the air is fed from an air source (a small compressor) to the air feeding ball butterfly motor-driving valve 65 via an air filter 56, a regulator 57 and an oiler 58.

The reason why those ball butterfly motor-driving valves are employed is to ensure the feeding and shutdown-feeding of steam or compressed air.

Upon finishing the fusion-bonding covering work for a predetermined period of time, the tubular body C is moved away from the rabbeted portions 2 and 3, and back to the stand-by position thereof, after the rabbeted-covering members F and M are respectively mounted on each of the heating surfaces 52 of the tubular body C, waiting for the next operation until the next building board 1 is arrived (to be explained hereinafter).

FIGS. 9(a) to 9(d) are diagrams explaining the positioning of the tubular body C.

The tubular body C is supported and three-dimensionally positioned by being held by a couple of robot hands 27 and 28 which are positioned corresponding to a couple of robot hand grippers 59 which are welded to the curved surface 53 (see FIG. 9). In order to enable the tubular body C to be three-dimensionally moved, the steam pipe P, the drain pipe DP and the air pipe AP are all connected with a flexible pipe at any desired portions thereof.

As shown in FIG. 9, the robot hand 27 acts on the overlying rabbeted portion 2 in such a manner that the tubular body C having the overlying rabbeted-covering member F set on the heating surface 52 is rotated and positioned to take a predetermined horizontal attitude, and then, parallel-translated in a slightly upward direction therefrom, while keeping the horizontal attitude, thus allowing the overlying rabbeted-covering member F to reach the overlying rabbeted portion 2.

On the other hand, the robot hand 28 acts on the underlying rabbeted portion 3 in such a manner that the tubular body C having the underlying rabbeted-covering member M set on the heating surface 52 is rotated until it takes a predetermined oblique angle attitude, and then, parallel-translated in a slightly upward direction therefrom, while keeping the slanted attitude, thus allowing the point "f" to be abutted with the back surface of the underlying rabbeted portion 3, after which the tubular body C is further rotated until the underlying rabbeted-covering member M is contacted with the underlying rabbeted portion 3 (see FIG. 9(c) and FIG. 9(d)).

It is desirable, in these approaching operation, to let the robot hands 27 and 28 teach in advance about these specific movements so as to allow the tubular body C to smoothly approach these rabbeted portions 2 and 3 without causing the tubular body C to impinge against these rabbeted portions 2 and 3 at a stroke.

Concurrently with the aforementioned approaching operation of the tubular body C, the upper pushing plate 30 (a sponge sheet 30A having a predetermined thickness is adhered in advance to the bottom surface thereof; see FIG. 6) is moved downward from over the surface of the building board along an upper pushing plate positioning mechanism 31 until it reaches the surface of the building board, thereby slightly pushing the upper surface of the building board. Thereafter, the overlying and underlying rabbeted-covering members F and M are heated by hot steam by making use of the aforementioned rabbeted-covering heating means 32 and 33.

Figure 10:
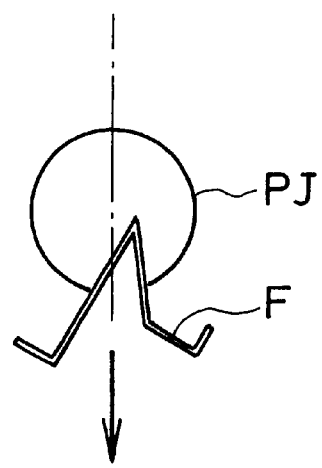
FIGS. 10(a), 10(b), and 10(c) are a diagram illustrating a method of setting a rabbeted-covering member to the covering heating apparatus (No.1)
Figure 10:
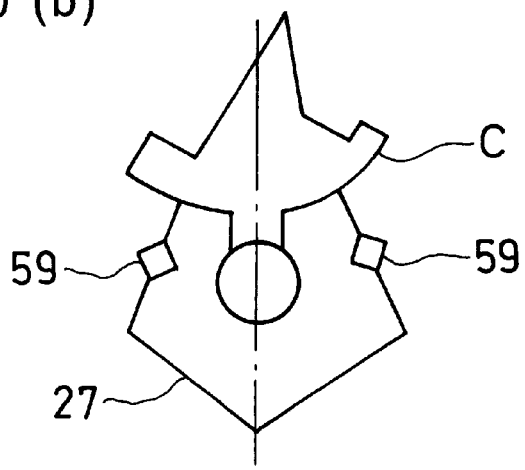
Figure 10:
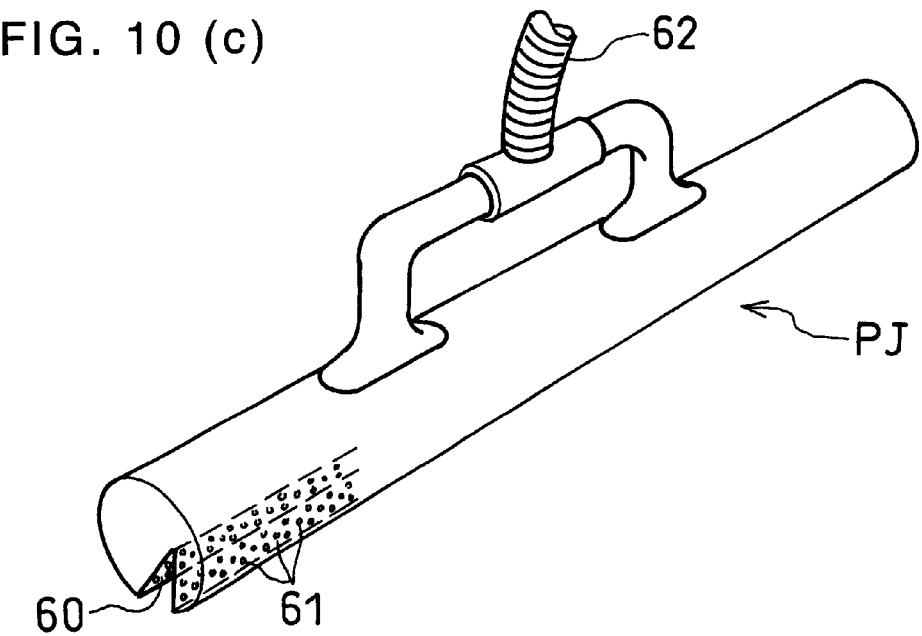
Figure 11:
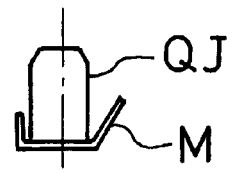
FIGS. 11(a), 11(b), and 11(c) are a diagram illustrating a method of setting a rabbeted-covering member to the covering heating apparatus (No. 2)
Figure 11:
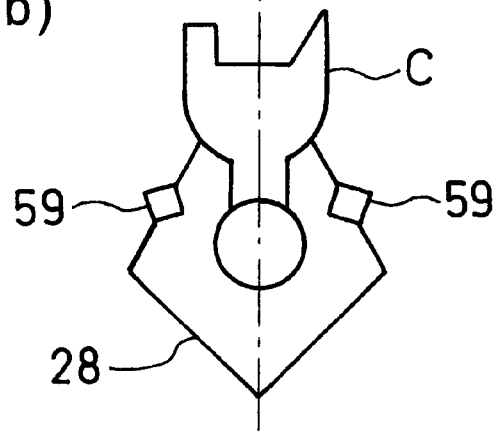
Figure 11:
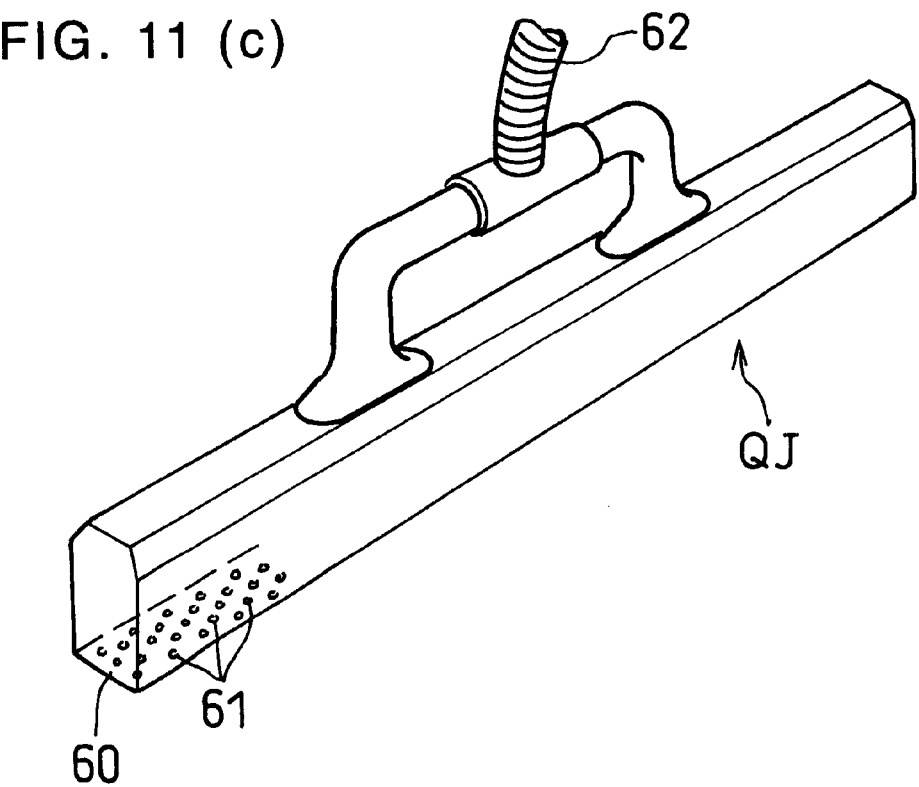

FIGS. 10 and 11 are diagrams explaining a method of setting the overlying and underlying rabbeted-covering members F and M one by one onto the heating surfaces 52 of the covering-heating means 32 and 33. In this case, exclusive suction tubes PJ and QJ, where a plurality of punching holes 61 are formed at the opposite surface 60 facing to the overlying and underlying rabbeted-covering members F and M (see FIGS. 10C and 11C) for blower/suction of a part of the overlying and underlying rabbeted-covering members F and M having a shape shown in FIGS. 10 and 11, each connected with a blower/suction flexible duct pipe 62 are employed for moving, while keeping the sucking action thereof, the overlying-and underlying-rabbeted covering members F and M one by one to nearly a region over the stand-by portion of the tubular body C by making use of a positioning mechanism (not shown) which is constructed exclusively for this purpose.

When the overlying-and underlying-rabbeted covering members F and M moved over the stand-by portion of the tubular body C as mentioned above, the sucking action by these exclusive suction tubes PJ and QJ is suspended, thereby allowing the overlying-and underlying-rabbeted covering members F and M thus carried to this region to be released and placed on the heating surface 52 of the tubular body C.

Figure 12:
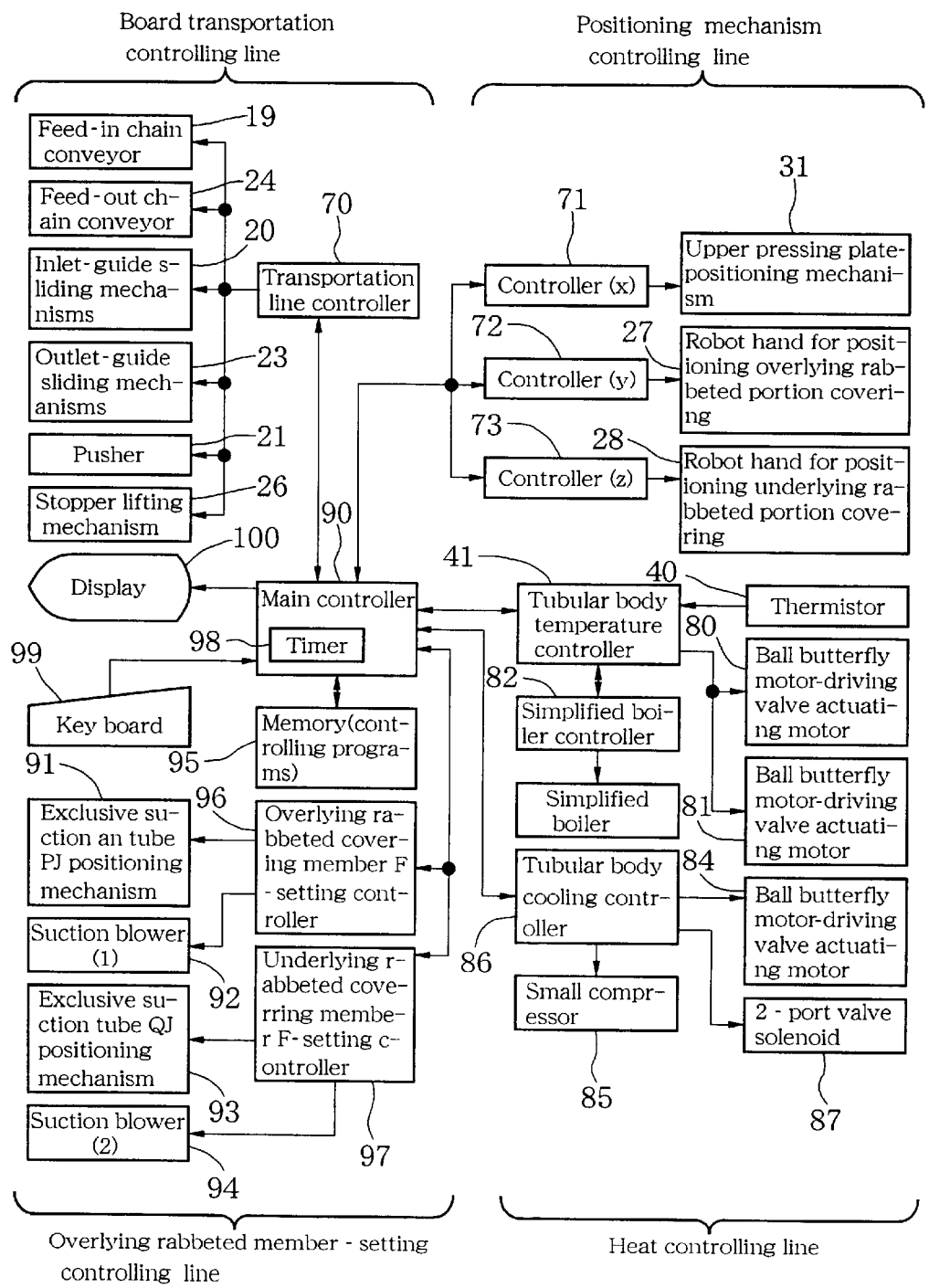
FIG. 12 is a block diagram of the entire control system for a plastic sheet-covering heating apparatus.

FIG. 12 is an entire control system for the covering-heating apparatus according to the present invention, wherein each component is controlled by a main controller 90 as explained below. First of all, the main controller 90 which controls a transportation line controller 70 for synchronously controlling the operations of a feed-in chain conveyor 19, a feed-out chain conveyor 24, an inlet-guide sliding mechanisms 20, an outlet-guide sliding mechanisms 23, a pusher 21 and a stopper lifting mechanism 26 (all constituting a board transportation controlling line). The upper pressing plate-positioning mechanism 31, the robot hand 27 for positioning the overlying rabbeted portion covering, and the robot hand 28 for positioning the underlying rabbeted portion covering are controlled by a controller (x) 71, a controller (y) 72 and a controller (z) 73, respectively (all constituting a positioning mechanism controlling line). The main controller 90 also controls a tubular body temperature controller 83 which controls the operation of the simplified boiler B and actuates a ball butterfly motor-driving valve actuating motor 80 and a ball butterfly motor-driving valve actuating motor 81 on the basis of the temperature detected by the thermistor 40 disposed inside the tubular body C, thereby controlling the temperature inside the tubular body C. The main controller 90 also controls a tubular body cooling controller 86 which actuates a ball butterfly motor-driving valve actuating motor 84, a 2-port valve solenoid 87 and a small compressor 85 so as to cool the interior of the tubular body C, (all constituting a heating and cooling controlling line). The main controller 90 sill further controls an overlying rabbeted covering member F-setting controller 96 which controls a exclusive suction tube PJ positioning mechanism 91 and a suction blower (1) 92 so as to set the overlying rabbeted covering member F; and an underlying rabbeted covering member M-setting controller 97 which controls an exclusive suction tube QJ positioning mechanism 93 and a suction blower (2) 94 so as to set the underlying rabbeted covering member M (all constituting a rabbeted member-setting controlling line).

The main controller 90 is provided therein with a timer 98 for controlling each of the aforementioned controlling lines on the basis of the controlling programs which are stored in a memory 95, so that it is possible to display a result on a display 100 by inputting data as required to the main controller 90 via a key board 99. As explained above, it is possible according to the manufacturing system of this embodiment to control each of the controllers by means of the main controller 90, while permitting individual operation to be controlled by the dedicated controller so as to enable an organically associated operations to be performed, through each functional component is operated individually.

Figure 13:
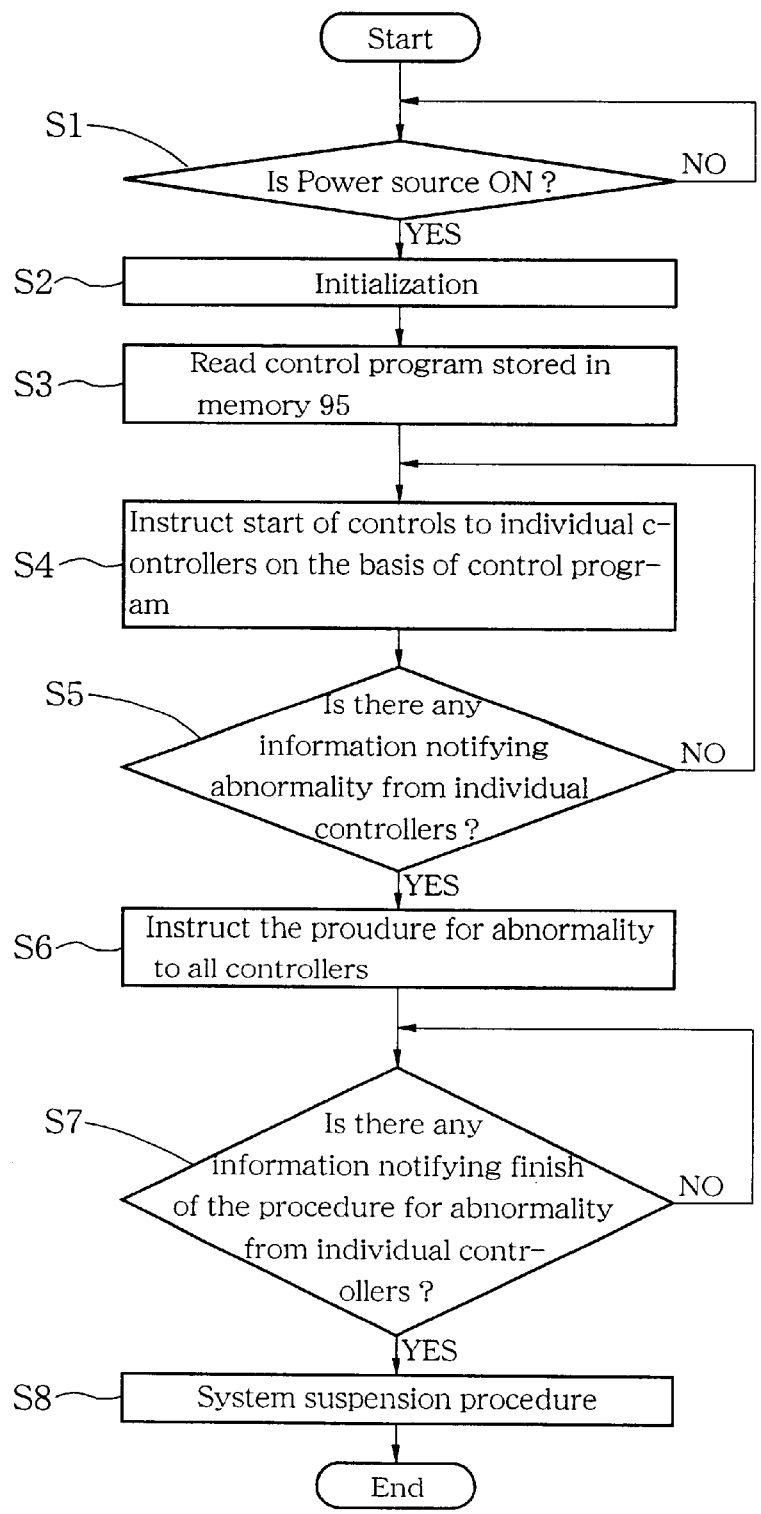
FIG. 13 is a flow chart explaining the covering heating step of building board.

FIG. 13 is a flow chart illustrating the operation of the main controller shown in FIG. 12. Since details of the operation of each functional component are already explained in the above description, the descriptions thereof are omitted.

First of all, if the system power source is ON (Step S1). If it is ON, the initialization is performed which is mainly to set up the communication of the main controller with individual controllers (Step S2). Then, the control program stored in the memory of the main controller 90, in which the time chart for instructing the operation of individual controllers is included, is read out (Step S3). Then, the instruction to individual controllers is given on the basis of the control program (Step S4).

Next, it is determined if there is any information notifying the generation of abnormality from individual controllers (Step S5). If the information is nothing, the procedure is returned back to the Step S4 and the instruction of control to all of individual controllers is continued. If the information is received, perform of the procedure for the abnormality is instructed to individual controllers (Step S6). The main controller 90 continues this procedure until it receives the information notifying the finish of the procedure for the abnormality (Step S7). When the main controller received the information notifying the finish of the procedure for the abnormality, the system suspension procedure is performed (Step S8), and this consecutive control flow is finished.

It should be noted that the present invention is not limited to the aforementioned embodiments. For example, in the above embodiments, a horizontal siding work using elongated building boards has been explained, so that the underlying rabbeted portion 3 is formed on the upper edge of the building board 1, while the overlying rabbeted portion 2 is formed on the lower edge of the building board 1, the right and left ends of the building board being cut flat, thereby enabling the right and left ends to be butt-jointed. However, it is of course possible to apply the present invention to a building board 1 of four-side ship-lap structure where all of four sides thereof are provided with a rabbeted portion by taking as suitable measures such as providing the apparatus with rotational means, etc., thus suitably modifying the manufacturing apparatus of the present invention.

The following advantages can be obtained by the present invention.

(1) Since the water absorption from the back surface and rabbeted portions of the building board can be effectively prevented, the dimensional change in the whole board can be reduced.

(2) Since the invasion of carbon dioxide from the back surface and the rabbeted portions of building board can be substantially prevented, the carbonation or neutralization of the cement substrate 14 can be effectively prevented.

(3) Since the water absorption from the back surface and rabbeted portions of building board can be effectively prevented, the exudation of chlorine ion from the interior of the building board can be prevented, so that the oxidization of iron (the generation of rust) can be prevented even if building board is fixed to an underlying steel construction.

(4) Since the membrane strength (tear strength, rupture strength, etc.) is higher as compared with the conventional sealer coating, the generation of scratch, crack, chipping can be inhibited.

(5) When this building board is fixed to an underlying steel construction, the generation of creak by the building board can be prevented.

(6) Since a plastic sheet is formed on the rabbeted portions of the building board, it is possible to ensure a shock absorption to a certain extent, so that even if an external force is applied to the rabbeted portions of building board, the phenomenon of fine cracking thereof can be effectively alleviated.

What is claimed is:

1. A building board manufacturing apparatus including a mechanism to place and fuse a plastic cover onto opposing rabbeted side portions of a substrate, the manufacturing apparatus comprising:

an elongated hollow body positioned on each side of the substrate, each elongated hollow body having a heated surface extending along one side thereof for performing fusion bonding, the heating surface shaped to conform with a shape of first and second rabbeted covering members, the first and second rabbeted covering members being formed prior to application to each heating surface and each comprising a series of interconnected shapes;

a steam inlet for providing steam to an interior of the elongated hollow body in order to raise each heating surface to a desired fusion bonding temperature and an air inlet to provide air to the interior of the elongated hollow body to lower the temperature of each heating surface to a quenching temperature; and a pressing apparatus to move each elongated hollow body toward and away from the rabbeted portion of the substrate and to press the first and second rabbeted covering members against the substrate in order to maintain the shape of each covering member while simultaneously providing heat to fuse each covering member to the substrate.

2. An apparatus for fusion-bonding a plastic covering onto a rabbeted portion of a building board, said apparatus comprising:

a plastic cover fusing assembly including a elongated hollow body with a fusing surface, the fusing surface having a shape necessary for covering the rabbeted portion, a plastic cover pre-formed into a shape corresponding to the rabbeted portion and mounted on the fusing surface, said elongated hollow body being moved toward the rabbeted portion by a dedicated positioning mechanism to position the pre-formed plastic cover against the building board, said elongated hollow body being configured to increase the temperature of the fusing surface and to thereafter provide a quenching temperature thereto, the surface temperature of the fusing surface being increased through saturated steam feeding at a predetermined pressure into said elongated hollow body and with the quenching temperature being accomplished through feeding air into said elongated hollow body;

a back surface building board support assembly;

a holding mechanism to provide a suitable holding force to thereby fix and hold the building board at a predetermined position on the support assembly during plastic cover fusion;

an in-feed assembly to feed the building board into a position on the support assembly where the board is held during fusion-bonding; and an out-feed assembly to move the building board from the held position after the fusion bonding operation is finished.

3. A building board manufacturing apparatus including a mechanism to place and fuse a plastic cover onto opposing rabbeted side portions of a substrate, the manufacturing apparatus comprising:

an elongated hollow body positioned on each side of the substrate, each elongated hollow body having a heating surface extending along one side thereof for performing fusion bonding, the heating surface shaped to conform with a shape of first and second rabbeted covering members, the first and second rabbeted covering members being formed prior to application to each heating surface and each comprising a series of interconnected shapes;

a steam inlet for providing steam to an interior of the elongated hollow body in order to raise each heating surface to a desired fusion bonding temperature;

a steam inlet valve associated with the steam inlet for regulating introduction of steam into the steam inlet;

a temperature controller for controlling entrance of steam into the steam inlet valve based on a measured temperature within the elongated hollow body;

an air inlet to provide air to the interior of the elongated hollow body to lower the temperature of each heating surface to a quenching temperature;

an air source for providing air to the air inlet;

an air inlet valve for controlling feeding of air from the air source into the air inlet, the air inlet valve remaining open for a predetermined time period in order to achieve the quenching temperature; and a pressing apparatus to move each elongated hollow body toward and away from the rabbeted portion of the substrate and to press the first and second rabbeted covering members against the substrate in order to maintain the shape of each covering member while simultaneously providing heat to fuse each covering member to the substrate.

* * * * *